(12) United States Patent
Hsu

(10) Patent No.: US 11,408,214 B1
(45) Date of Patent: Aug. 9, 2022

(54) DUAL AXIS HINGE

(71) Applicant: FOSITEK CORPORATION, New Taipei (TW)

(72) Inventor: An-Szu Hsu, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 0 days.

(21) Appl. No.: 17/360,364

(22) Filed: Jun. 28, 2021

(30) Foreign Application Priority Data

Apr. 9, 2021 (TW) ................................ 110112874

(51) Int. Cl.
- *E05D 3/06* (2006.01)
- *E05D 1/04* (2006.01)
- *E05D 3/12* (2006.01)
- *E05D 3/14* (2006.01)
- *E05D 3/18* (2006.01)

(52) U.S. Cl.
CPC ............... *E05D 3/122* (2013.01); *E05D 3/14* (2013.01); *E05D 3/18* (2013.01); *E05Y 2900/606* (2013.01)

(58) Field of Classification Search
CPC ........ G06F 1/16; G06F 1/1616; G06F 1/1681; G06F 1/166; G06F 1/1679; H04M 1/022; H04M 1/0214; H04M 1/0216; H04M 1/0222; H05K 5/0226; F16M 11/10; E05D 11/00; E05D 11/1021; E05D 11/1078; E05D 11/082; E05D 3/14; E05D 3/18; E05D 3/122; E05D 3/12; E05D 3/16; E05D 3/06; E05D 3/32; E05D 15/28; E05D 15/30; E05D 15/32; E05D 15/40; E05D 1/04; E05D 2001/045; E05Y 2900/606; E05Y 2900/60; E05Y 2201/716; E05Y 2201/722; Y10T 16/542; Y10T 16/543; Y10T 16/544; Y10T 16/5443; Y10T 16/5445; Y10T 16/5448; Y10T 16/545; Y10T 16/54038
See application file for complete search history.

(56) References Cited

U.S. PATENT DOCUMENTS

| | | | | |
|---|---|---|---|---|
| 9,879,715 | B1 * | 1/2018 | Hsu | ............................ E05D 7/00 |
| 10,036,188 | B1 * | 7/2018 | Yao | ............................ E05D 3/122 |
| 11,243,578 | B2 * | 2/2022 | Torres | .................... G06F 1/1616 |
| 2016/0010374 | A1 * | 1/2016 | Hsu | ........................ G06F 1/1681 74/414 |
| 2017/0139446 | A1 * | 5/2017 | Lan | ............................ E05D 3/18 |
| 2020/0103935 | A1 * | 4/2020 | Hsu | ........................ G06F 1/1681 |
| 2020/0409429 | A1 * | 12/2020 | Hsu | ........................ G06F 1/1681 |
| 2021/0067614 | A1 * | 3/2021 | Cheng | .................... G06F 1/1681 |
| 2021/0173449 | A1 * | 6/2021 | Yao | ........................ G06F 1/1652 |
| 2021/0250431 | A1 * | 8/2021 | Park | ....................... G06F 1/1681 |
| 2021/0267076 | A1 * | 8/2021 | Zhang | ................. E05D 11/1014 |
| 2022/0086265 | A1 * | 3/2022 | Shang | ...................... F16C 11/04 |
| 2022/0100238 | A1 * | 3/2022 | Siddiqui | ............... G06F 1/1683 |

* cited by examiner

*Primary Examiner* — Chuck Y Mah
(74) *Attorney, Agent, or Firm* — Burris Law, PLLC

(57) ABSTRACT

A dual axis hinge includes: a track seat that extends along a center line, and that has two pairs of inner track grooves and two pairs of outer track grooves; two support mechanisms that are respectively disposed on opposite sides of the center line, that movably engage the inner track grooves and the outer track grooves of the track seat, and that are convertible between a folded state and an unfolded state; and two synchronization mechanisms that are respectively connected to opposite sides of the track seat, and that are configured to move in a synchronous manner such that movements of the support mechanisms relative to the track seat are synchronized.

9 Claims, 13 Drawing Sheets

DUAL AXIS HINGE

CROSS-REFERENCE TO RELATED APPLICATION

This application claims priority of Taiwanese Patent Application No. 110112874, filed on Apr. 9, 2021.

FIELD

The disclosure relates to a hinge, and more particularly to a dual axis hinge for use with a foldable electronic device.

BACKGROUND

Conventional foldable electronic devices (e.g., smartphones) are mainly divided into two groups: inward-folding electronic devices and outward-folding electronic devices.

A common issue occurring in the conventional inward-folding electronic devices is that, when being folded, the middle portions of the flexible displays are bent and often crammed by the casings into limited spaces and thus are prone to damage.

SUMMARY

Therefore, the object of the disclosure is to provide a dual axis hinge for use with an inward-folding electronic device that can alleviate the drawback of the prior art.

According to the disclosure, a dual axis hinge includes a track seat, two support mechanisms and two synchronization mechanisms.

The track seat extends along a center line that extends in a first direction, and has a top surface, two pairs of inner track grooves and two pairs of outer track grooves. The inner track grooves are disposed below the top surface, and are respectively and symmetrically disposed on opposite sides of the center line. Each pair of the inner track grooves are spaced apart from each other in the first direction and open towards each other. Each of the inner track grooves extends along an imaginary plane normal to the first direction and is curved. The outer track grooves are disposed below the top surface, and are respectively and symmetrically disposed on the opposite sides of the center line. Each pair of the outer track grooves are spaced apart from each other in the first direction and open away from each other. Each of the outer track grooves extends along an imaginary plane normal to the first direction and is curved.

The support mechanisms are respectively disposed on the opposite sides of the center line, are symmetric with respect to the center line, are movably connected to the track seat, and are convertible between a folded state and an unfolded state. Each of the support mechanisms includes: a sliding frame and two linking frames. The sliding frame of each of the support mechanisms has a bearing plate portion that has a supporting surface, and a back surface being opposite to the supporting surface; a sliding shaft that extends in the first direction, and that has opposite end segments respectively and movably engaging two corresponding ones of the inner track grooves of the track seat that are disposed on the same side of the center line; and a support body that is connected to the back surface of the bearing plate portion, and that has a connecting end portion connected to the sliding shaft. The linking frames of each of the support mechanisms are spaced apart from each other in the first direction, are respectively and slidably connected to opposite ends of the support body of the sliding frame, and are respectively and movably engaging two corresponding ones of the outer track grooves of the track seat that are disposed on the same side of the center line.

The synchronization mechanisms are spaced apart from each other in the first direction, and are respectively connected to opposite sides of the track seat. Each of the synchronization mechanisms includes two pivot shafts and two pivot members. The pivot shafts of each of the synchronization mechanisms extend in the first direction, are respectively disposed on the opposite sides of the center line, and are rotatable relative to the track seat. Each of the pivot members of each of the synchronization mechanisms is co-rotatably connected to a respective one of the pivot shafts, and is slidably connected to a respective one of the linking frames. The pivot members are configured to move in a synchronous manner such that during conversion of the support mechanisms between the folded and unfolded states, movements of the support mechanisms relative to the track seat are synchronized.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
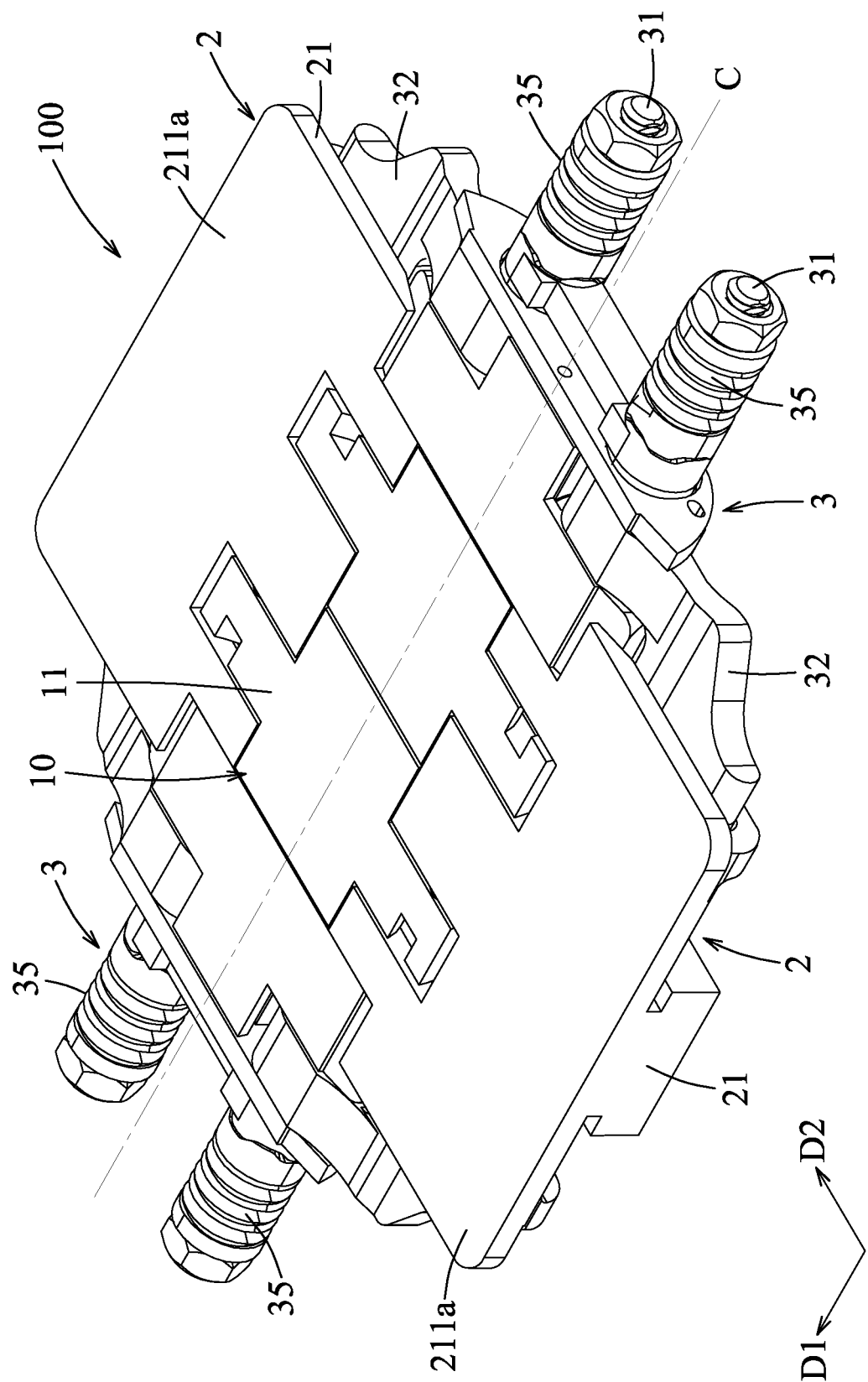
FIG. 1 is a perspective view of an embodiment of a dual axis hinge according to the disclosure.
Figure 2:
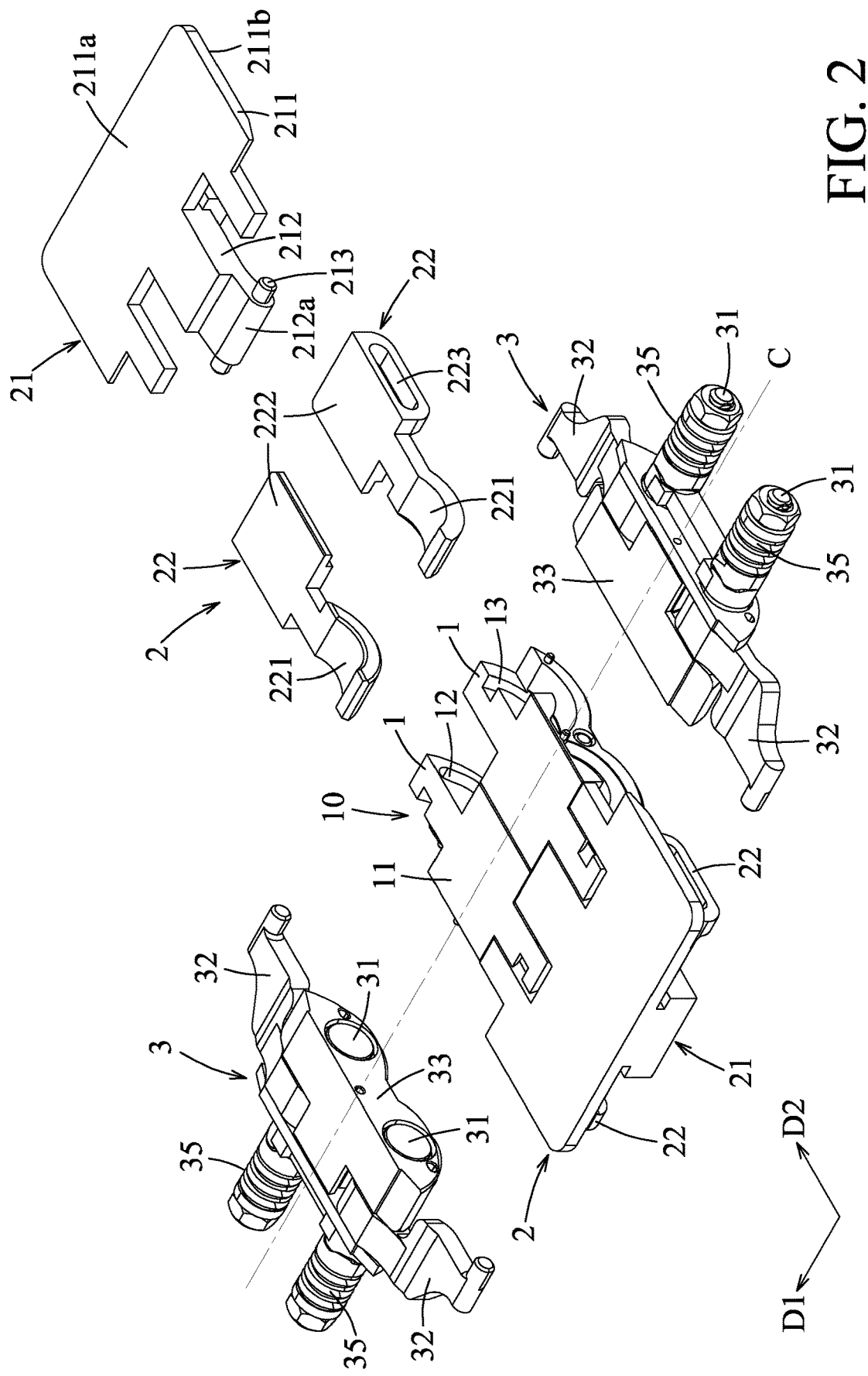
FIG. 2 is a partly exploded perspective view of the embodiment.
Figure 3:
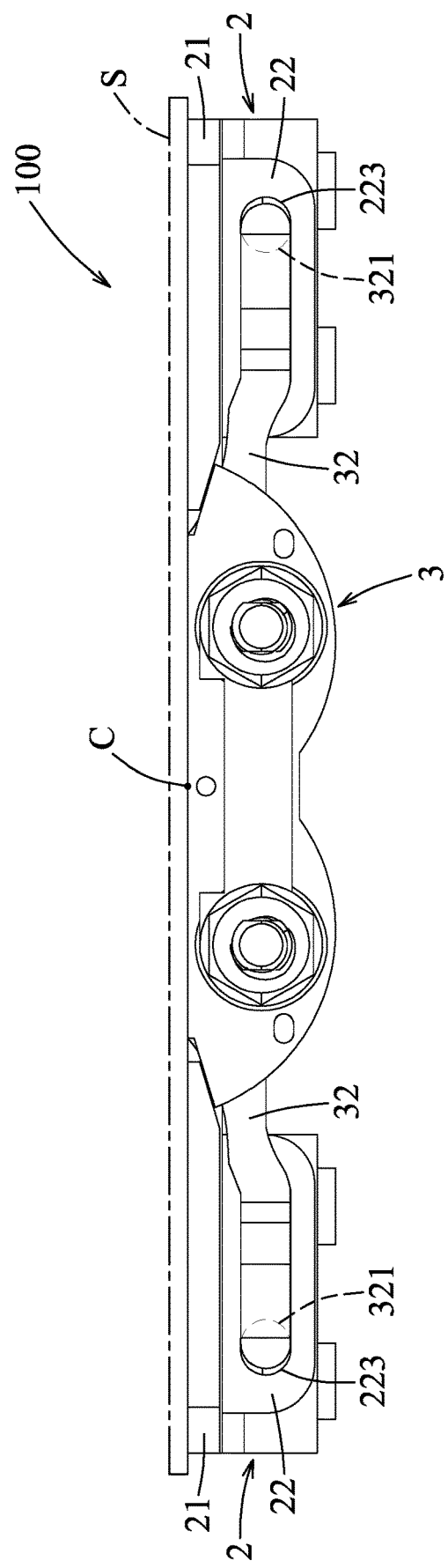
FIG. 3 is a side view of the embodiment, illustrating two support mechanisms of the embodiment in an unfolded state.

Referring to FIGS. 1 to 3, an embodiment of a dual axis hinge 100 according to disclosure is adapted to be mounted in an inward-folding electronic device (not shown) having a flexible display (S), and is adapted to interconnect two casings (not shown) of the electronic device and to support the flexible display (S). The dual axis hinge 100 includes a track seat 10, two support mechanisms 2 and two synchronization mechanisms 3.

Figure 4:
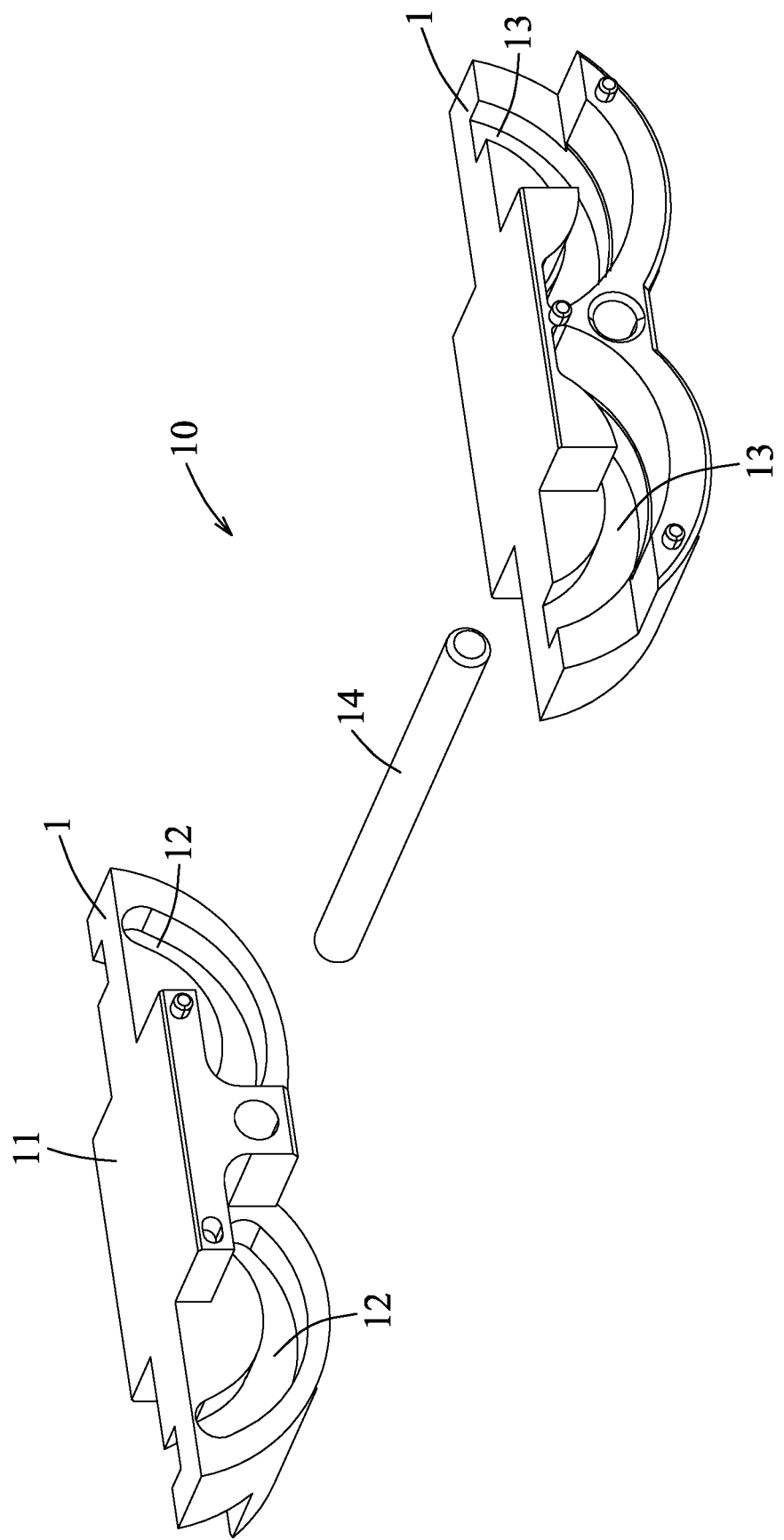
FIG. 4 is an exploded perspective of a track seat of the embodiment.

Referring to FIGS. 1, 2 and 4, the track seat 10 extends along a center line (C) extending in a first direction (D1), and has a top surface 11, two pairs of inner track grooves 12, and two pairs of outer track grooves 13.

The inner track grooves 12 are disposed below the top surface 11, and are respectively and symmetrically disposed on opposite sides of the centerline (C). Each pair of the inner track grooves 12 are spaced apart from each other in the first direction (D1) and are open toward each other. Each of the inner track grooves 12 extends along an imaginary plane normal to the first direction (D1) and is curved.

The outer track grooves 13 are disposed below the top surface 11, and are respectively and symmetrically disposed on the opposite sides of the center line (C). Each pair of the outer track grooves 13 are spaced apart from each other in the first direction (D1) and are open away from each other. Each of the outer track grooves 13 extends along an imaginary plane normal to the first direction (D1) and is curved.

In the present embodiment, the track seat 10 includes two seat bodies 1 that are arranged along the center line (C) and that are fixedly connected together, and a connecting pin 14 that extends through the seat bodies 1 for strengthening the connection therebetween.

Each of the seat bodies 1 has an inner surface that is formed with two corresponding ones of the inner track grooves 12 which are spaced apart from each other in a second direction (D2) perpendicular to the first direction (D1), and an outer surface that is opposite to the inner surface along the center line (C), and that is formed with two corresponding ones of the outer track grooves 13 which are spaced apart from each other in the second direction (D2). The two inner surfaces of the seat bodies 1 face towards each other, and the two outer surfaces of the seat bodies 1 face away from each other.

Figure 5:
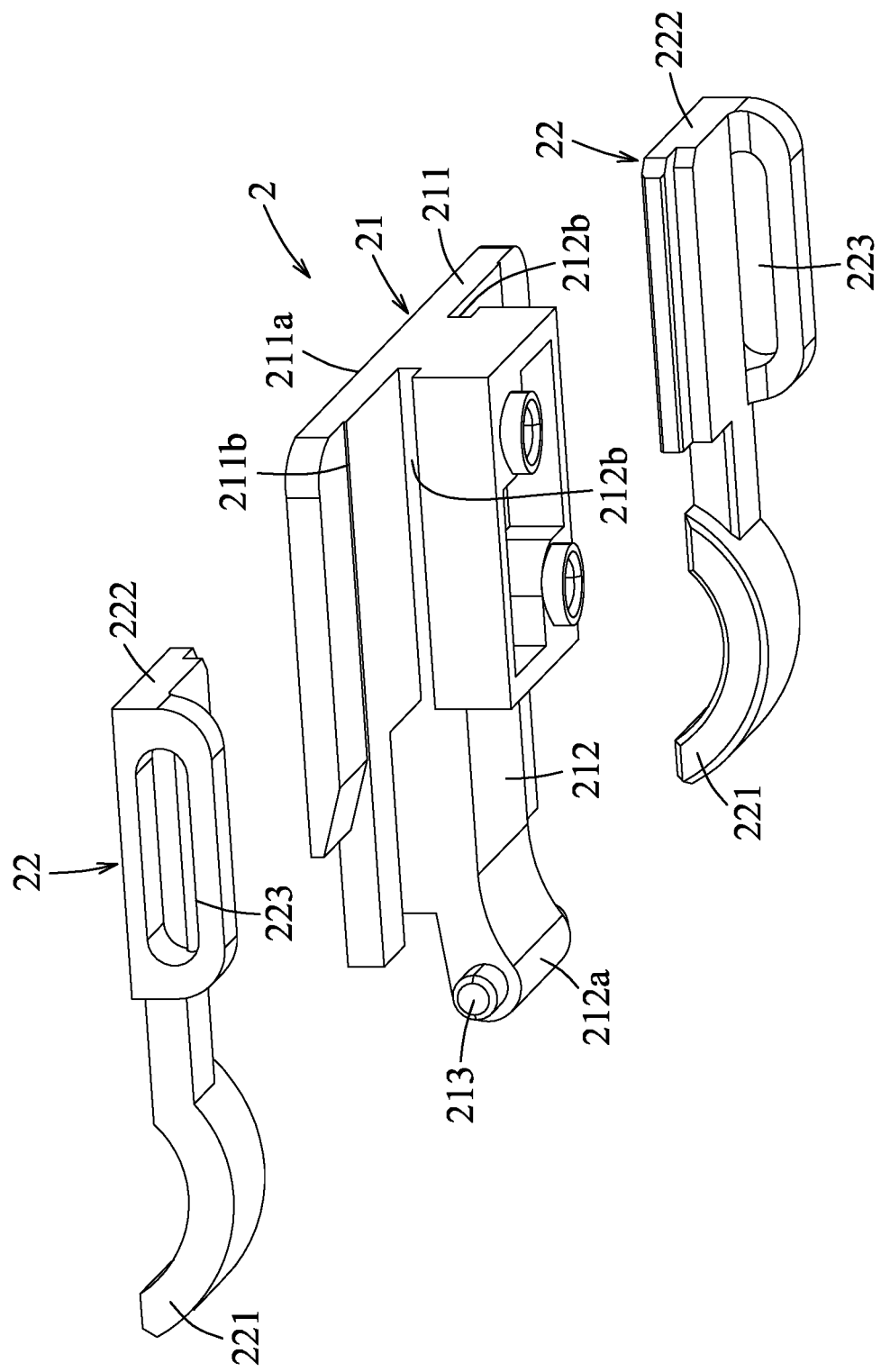
FIG. 5 is an exploded perspective view of one of the support mechanisms of the embodiment.
Figure 6:
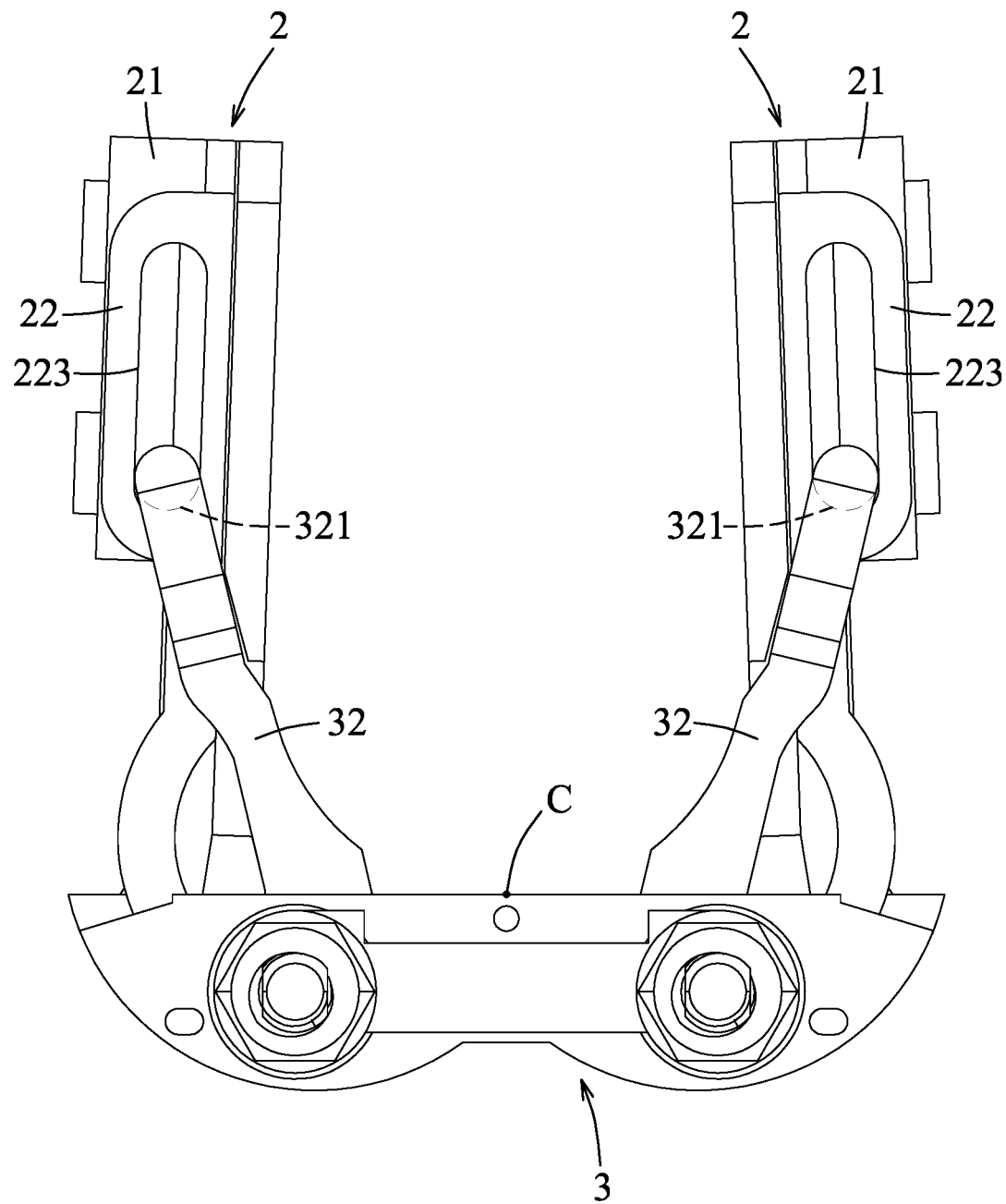
FIG. 6 is another side view of the embodiment, illustrating the support mechanisms of the embodiment in a folded state.

Referring to FIGS. 1, 2 and 5, the support mechanisms 2 are respectively disposed on the opposite sides of the center line (C), are symmetric with respect to the center line (C), are movably connected to the track seat 10, and are convertible between an unfolded state (see FIGS. 1 and 3) and a folded state (see FIG. 6). Each of the support mechanisms 2 includes a sliding frame 21 and two linking frames 22.

The sliding frame 21 of each of the support mechanisms 2 has a bearing plate portion 211, a support body 212 and a sliding shaft 213. For the sliding frame 21 of each of the support mechanisms 2, the bearing plate portion 211 has a supporting surface 211a, and a back surface 211b opposite to the supporting surface 211a; the sliding shaft 213 extends in the first direction (D1), and has opposite end segments that respectively and movably engage two corresponding ones of the inner track grooves 12 of the track seat 10 that are disposed on the same side of the center line (C); and the support body 212 is connected to the back surface 211b of the bearing plate portion 211, and has a connecting end portion 212a that is disposed closer to the center line (C) than the bearing plate portion 211, and that is connected to the sliding shaft 213.

The linking frames 22 of each of the support mechanisms 2 are spaced apart from each other in the first direction (D1), are respectively and slidably connected to opposite ends of the support body 212 of the sliding frame 21 (i.e., the support body 212 is disposed between the linking frames 22), and respectively and movably engage two corresponding ones of the outer track grooves 13 of the track seat 10 that are disposed on the same side of the center line (C). It should be noted that, for each of the support mechanisms 2 in the present embodiment, the bearing plate portion 211 and the support body 212 of sliding frame 21 are integrally formed as one piece, and the sliding shaft 213 is a separate component that extends through the connecting end portion 212a of the support body 212. However, in variations of the embodiment, the sliding shaft 213 of each of the support mechanisms 2 may also be formed integrally with the connecting end portion 212a. That is, the bearing plate portion 211, the support body 212 and the sliding shaft 213 of the sliding frame 21 of each of the support mechanisms 2 may all be integrally formed as one piece.

In the present embodiment, the sliding frame 21 of each of the support mechanisms 2 further has two first sliding grooves 212b that are spaced apart from each other in the first direction (D1), that open away from each other, and that extend in the second direction (D2). The support body 212 extends from a middle portion of the back surface 211b of the bearing plate portion 211 such that the linking frames 22 of each of the support mechanisms 2 abut slidably against the back surface 211b of the bearing plate portion 211, are disposed on opposite sides of the support body 212 in the first direction (D1), and respectively engage the first sliding grooves 212b of the sliding frame 21.

Specifically, each of the linking frames 22 of each of the support mechanisms 2 has: a curved sliding portion 221 that movably engages a respective one of the outer track grooves 13; a support portion 222 that movably engages a corresponding one of the first sliding grooves 212b of the sliding frame 21, and that abuts slidably against a corresponding portion of the back surface 211b of the bearing plate portion 211 of the sliding frame 21; and a second sliding groove 223 that extends in the second direction (D2).

Figure 7:
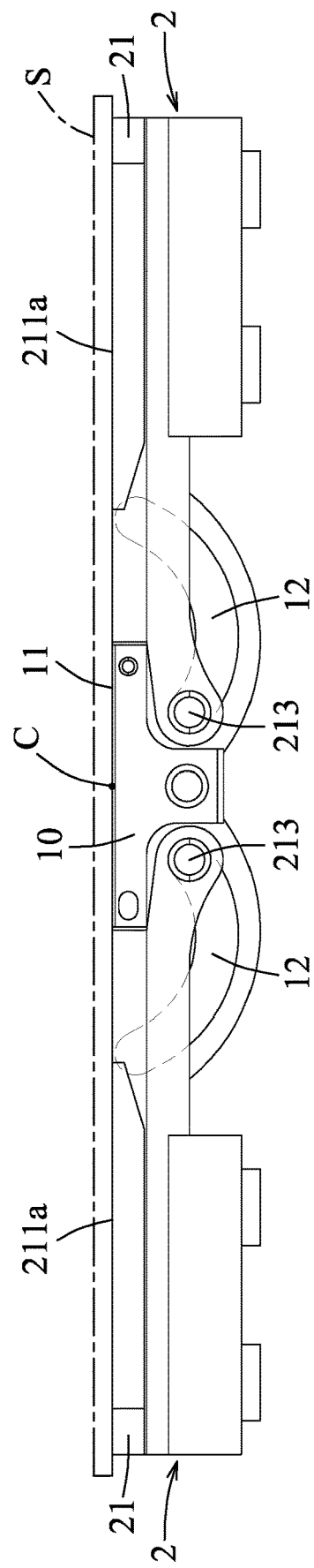
FIG. 7 is a side view illustrating positions of two sliding frames of the support mechanisms relative to the track seat when the support mechanisms are in the unfolded state.
Figure 8:
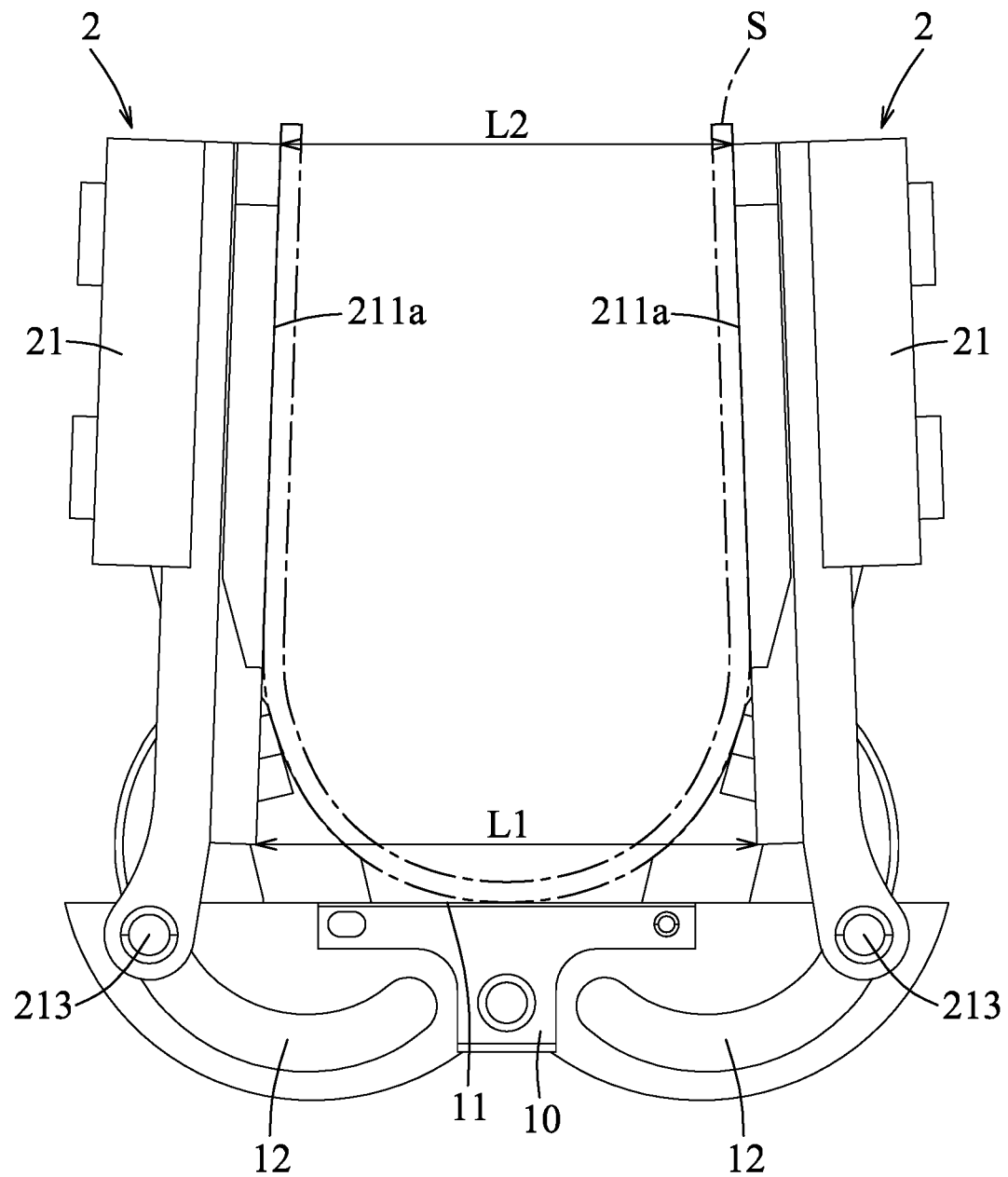
FIG. 8 is a side view illustrating positions of the sliding frames of the support mechanisms relative to the track seat when the support mechanisms are in the folded state.

Referring further to FIGS. 7 and 8, when the support mechanisms 2 are in the unfolded state (see FIG. 7), each of the end segments of the sliding shaft 213 of each of the support mechanisms 2 is disposed at one of opposite ends of a corresponding one of the inner track grooves 12 of the track seat 10 that is proximate to the center line (C), and the supporting surface 211a of each of the support mechanisms 2 is coplanar with the top surface 11 of the track seat 10 for supporting the flexible display (S) that is flat.

When the support mechanisms 2 are in the folded state (see FIG. 8), each of the end segments of the sliding shaft 213 of each of the support mechanisms 2 is disposed at the other one of the opposite ends of the corresponding one of the inner track grooves 12 of the track seat 10 that is distal from the center line (C), and a distance (L1) between ends of the supporting surfaces 211a of the support mechanisms 2 that are proximate to the top surface 11 is greater than a distance (L2) between ends of the supporting surfaces 211a of the support mechanisms 2 that are distal from the top surface 11. That is, as the support mechanisms 2 convert from the unfolded state towards the folded state, the end segments of the sliding shaft 213 move along the inner track grooves 12 to allow portions of the sliding frame 21 near the sliding shaft 213 to give way to the flexible display (S), which is bending, so that a bent portion of the flexible display (S), which has a cross section that resembles a horseshoe shape (see FIG. 8), can be accommodated without being crammed.

It should be noted that, in the present embodiment, each of the inner track grooves 12 has non-uniform curvature, which is derived from measuring deflection and deformation of the flexible display (S) during the bending process thereof. As such, a sliding trajectory of each of the end segments of the sliding shaft 213 along each of the inner track grooves 12 matches the bending of the flexible display (S), and the flexible display (S) is prevented from being pulled or squeezed by the movement of each of the support mechanisms 2. If, in variations of the embodiment, a flexible display (S) with different characteristics of flexibility is adopted, the track seat 10 may be replaced with a different one in which the inner track grooves 12 have different curvature design, and no redesigning or replacing of other components of the embodiment is needed.

Figure 9:
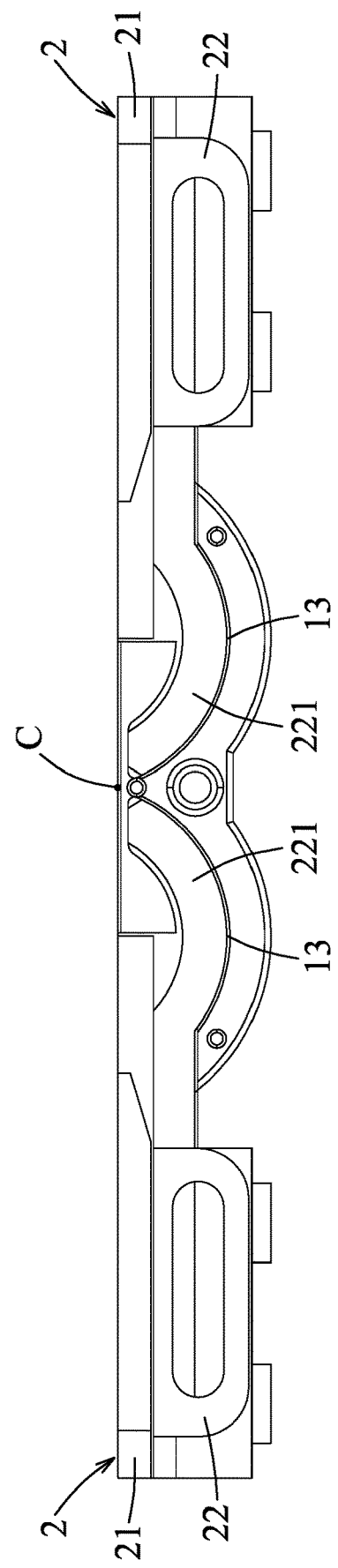
FIG. 9 is a side view illustrating positions of two linking frames of the support mechanisms relative to the track seat when the support mechanisms are in the unfolded state.
Figure 10:
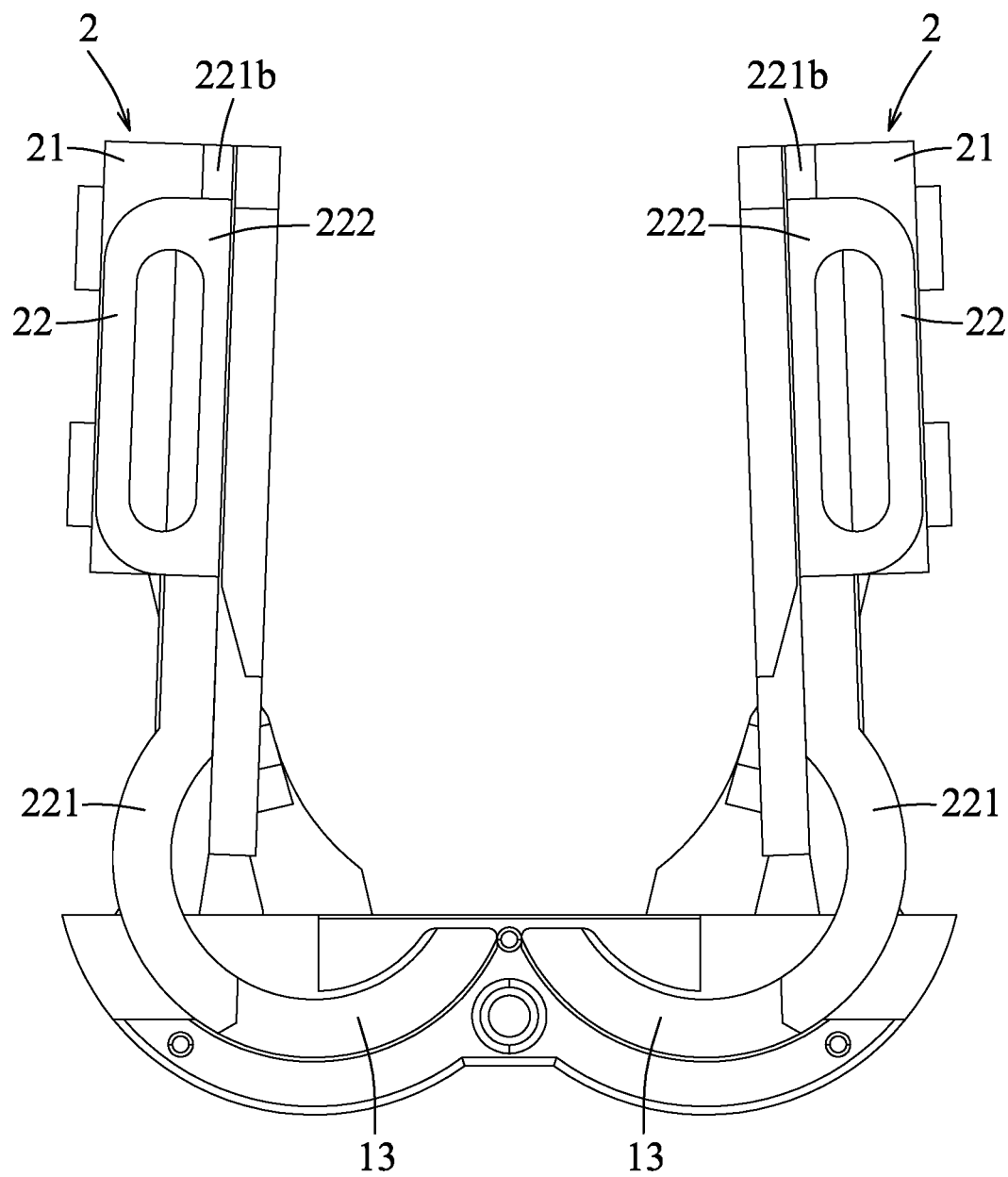
FIG. 10 is a side view illustrating positions of the linking frames of the support mechanisms relative to the track seat when the support mechanisms are in the folded state.
Figure 11:
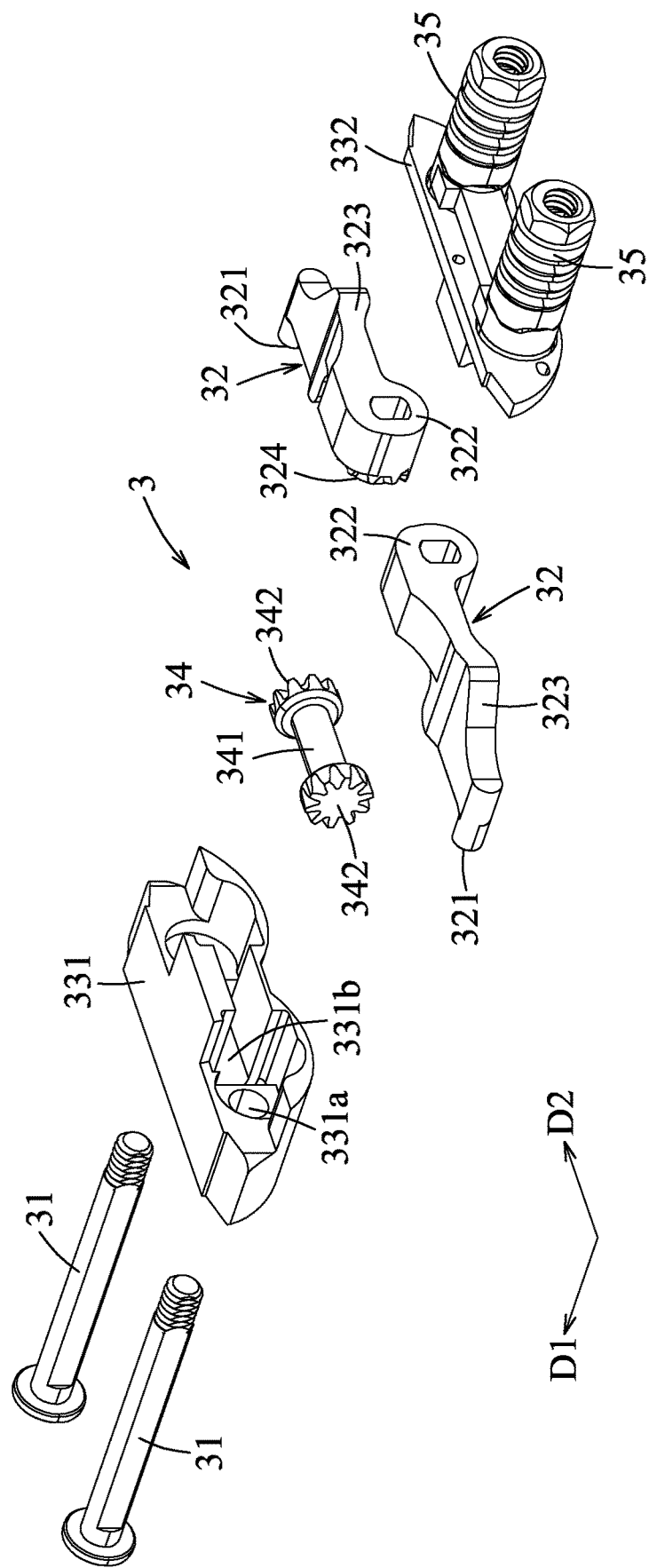
FIG. 11 is a partly exploded perspective view of a synchronization mechanism of the embodiment.
Figure 12:
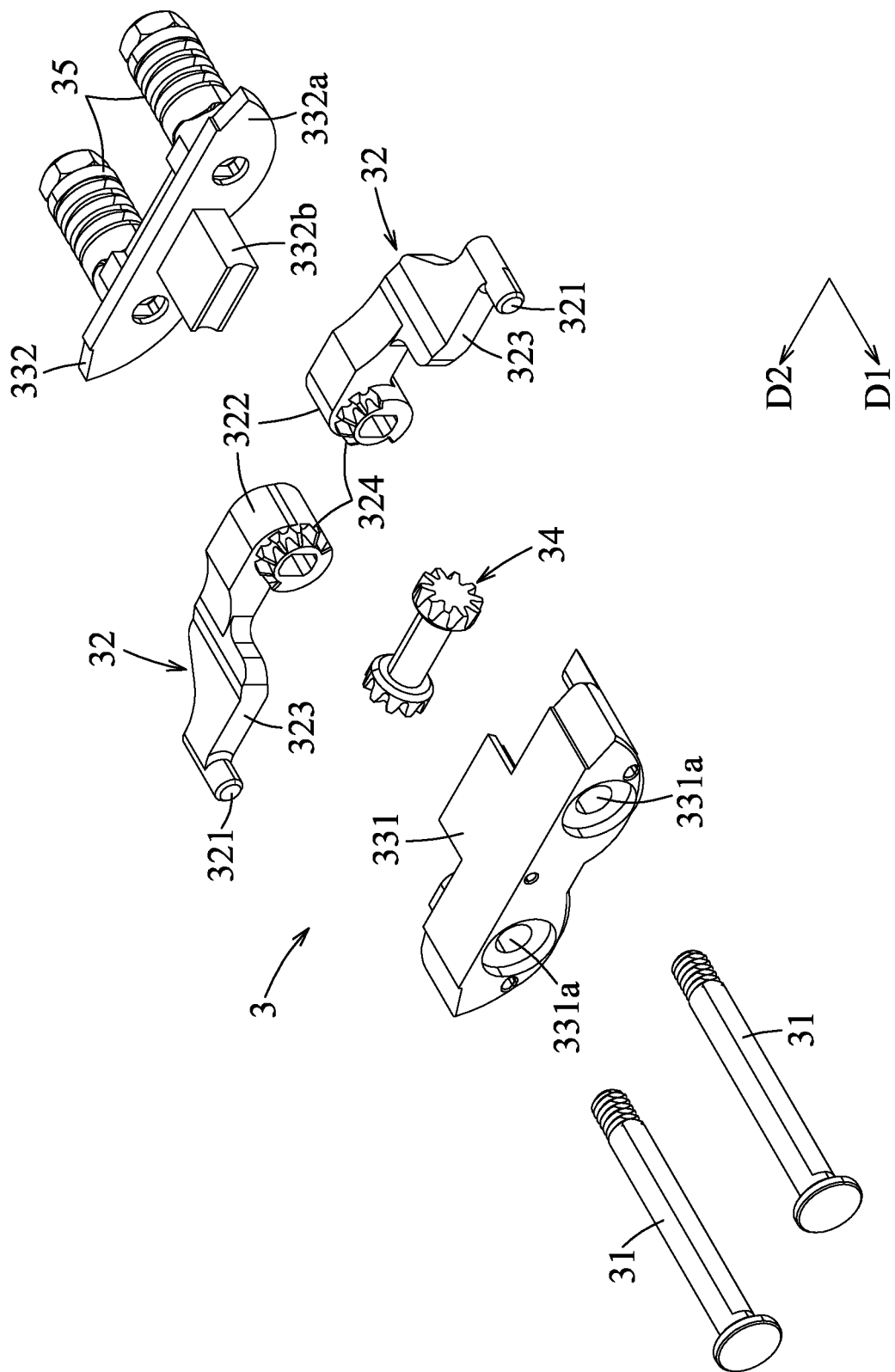
FIG. 12 is another partly exploded perspective view of the synchronization mechanism of the embodiment.
Figure 13:
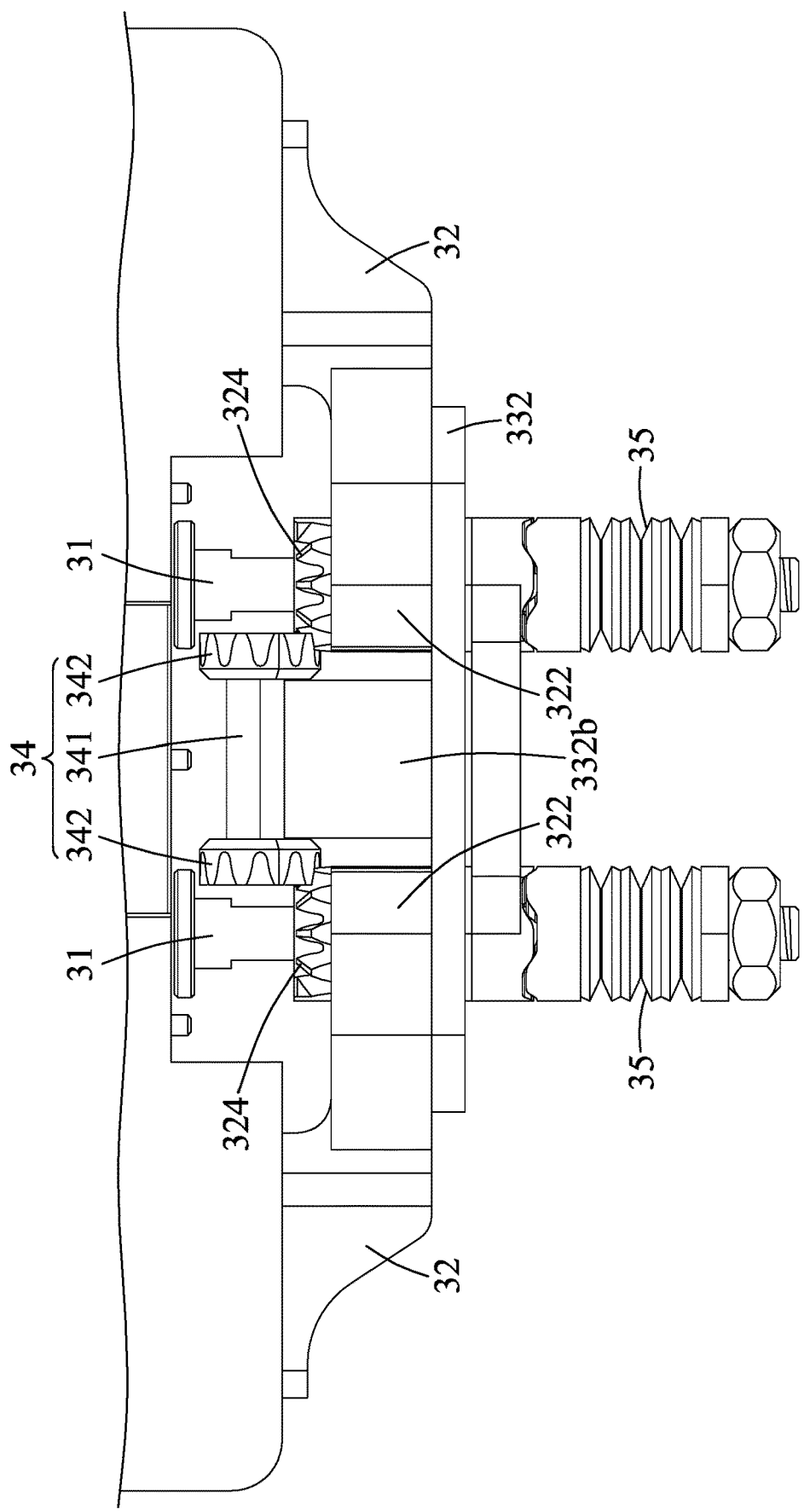
FIG. 13 is a schematic fragmentary top view of the embodiment, illustrating a synchronizing member and two pivot members of the synchronization mechanism of the embodiment.

Referring to FIGS. 9 and 10, in the present embodiment, each of the outer track grooves 13 is curved into an arc shape, and has a closed end proximate to the center line (C), and an open end distal from the center line (C). The sliding portion 221 of each of the linking frames 22 of each of the support mechanisms 2 corresponds in shape and size to each of the outer track grooves 13.

When the support mechanisms 2 are in the unfolded state (see FIG. 9), the sliding portion 221 of each of the linking frames 22 is received in the corresponding one of the outer track grooves 13 such that an end of the sliding portion 221 of each of the linking frames 22 proximate to the center line (C) is disposed at the closed end of the corresponding one of the outer track grooves 13.

When the support mechanisms 2 are in the folded state (FIG. 10), an end portion of sliding portion 221 of each of the linking frames 22 distal from the center line (C) is disposed outside of the corresponding one of the outer track grooves 13.

Referring to FIG. 2 and FIGS. 11 to 13, the synchronization mechanisms 3 are spaced apart from each other in the first direction (D1), and are respectively connected to opposite sides of the track seat 10.

Each of the synchronization mechanisms 3 includes two pivot shafts 31 and two pivot members 32. The pivot shafts 31 of each of the synchronization mechanisms 3 extend in the first direction (D1), are respectively disposed on the opposite sides of the center line (C), and are rotatable relative to the track seat 10. Each of the pivot members 32 of each of the synchronization mechanisms 3 is co-rotatably connected to a respective one of the pivot shafts 31, and is slidably connected to a respective one of the linking frames 22.

Specifically, each of the pivot members 32 has: a linking portion 321 that movably engages the second sliding groove 223 of a respective one of the linking frames 22 of the support mechanisms 2; a pivot portion 322 that is connected co-rotatably to a respective one of the pivot shafts 31 of each of the synchronization mechanisms 3; and a main body portion 323 that is connected between the pivot portion 322 and the linking portion 321.

The pivot members 32 are configured to move in a synchronous manner such that during conversion of the support mechanisms 2 between the folded and unfolded states, movements of the support mechanisms 2 relative to the track seat 10 are synchronized.

By virtue of the synchronization mechanisms 3 being disposed on opposite sides of the track seat 10 and configured to drive the support mechanisms 2 to move synchronously relative to the track seat 10, stresses resulting from the movements of the support mechanisms 2 are distributed evenly over components on both sides of the center line (C). Thus, the components are less likely to be damaged by stress concentration, and may have longer service life.

In the present embodiment, each of the synchronization mechanisms 3 further includes a gear seat 33, a synchronizing member 34 and two torsion spring units 35.

The gear seat 33 of each of the synchronization mechanisms 3 is fixedly connected to the track seat 10, and has a main component 331 and a retaining member 332. For the gear seat 33 of each of the synchronization mechanisms 3, the main component 331 has two shaft holes 331a that are provided for the pivot shafts 31 to extend respectively therethrough, and a retaining space 331b that receives the synchronizing member 34; and the retaining member 332 has a board body 332a that confines the synchronizing member 34 within the retaining space 331b of the main component 331, and that is provided for the pivot shafts 31 of each of the synchronization mechanisms 3 to extend therethrough, and a retaining block 332b that protrudes from the board body 332a toward the main component 331, and that positions the synchronizing member 34 in the retaining space 331b.

The torsion spring units 35 of each of the synchronization mechanisms 3 are respectively mounted to the pivot shafts 31 (i.e., the pivot shafts 31 extend through the board body 332a of the retaining member 332 of each of the synchronization mechanisms 3, and are respectively connected to the torsion spring units 35), and exert a biasing torque on the pivot shafts 31 to provide a positioning effect.

The synchronizing member 34 of each of the synchronization mechanisms 3 is rotatably mounted in the gear seat 33, and has a shaft rod portion 341 that extends in the second direction (D2), and two bevel gears 342 that are respectively connected to opposite ends of the shaft rod portion 341. Each of the pivot members 32 of each of the synchronization mechanisms 3 further has a bevel gear portion 324 that is formed on the pivot portion 322, and that engages a respective one of the bevel gears 342 of synchronizing member 34 such that rotation of the synchronizing member 34 of each of the synchronization mechanisms 3 drives the pivot members 32 to rotate in the above-mentioned synchronous manner.

When the support mechanisms 2 are in the unfolded state (see FIG. 3), the linking portion 321 of each of the pivot members 32 is disposed at one of opposite ends of the second sliding groove 223 of the respective one of the linking frames 22 of the support mechanisms 2 that is distal from the center line (C).

When the support mechanisms 2 are in the folded state (see FIG. 6), the linking portion 321 of each of the pivot members 32 is disposed at the other one of the opposite ends of the second sliding groove 223 of the respective one of the linking frames 22 of the support mechanisms 2 that is proximate to the center line (C).

Referring again to FIGS. 2, 3 and 6, in an operation of the present embodiment, when a user applies force to move either one of the support mechanisms 2, the linking frames 22 of each of the support mechanisms 2 are moved simultaneously via the synchronous movements of the pivot members 32 of each of the synchronization mechanisms 3, and during the same time, the sliding frame 21 of each of the support mechanisms 2 is driven by the linking frames 22 to slide relative thereto. As a result, the support mechanisms 2 are synchronously converted from the unfolded state to the folded state, or vice versa.

In sum, benefits of the present embodiment according to the disclosure are as follows.

By virtue of the sliding frames 21 being capable of providing space to accommodate the bent portion of the flexible display (S) through movements of the end segments of the sliding shafts 213 along the inner track grooves 12 of the track seat 10, the flexible display (S) is prevented from being damaged over time by the conversion of the support mechanisms 2 between the folded and unfolded states.

Moreover, the track seat 10 of the embodiment is modularized in that, if the flexible display (S) is to be replaced with one that has different characteristics of flexibility in order to meet specific requirements (e.g., to render a thinner and lighter final product), it may be replaced solely with one that has the inner track grooves 12 with different curvature design, and no redesigning or replacing of other components of the embodiment is needed.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A dual axis hinge comprising:
a track seat that extends along a center line extending in a first direction, and that has
a top surface,
two pairs of inner track grooves disposed below said top surface, and respectively and symmetrically disposed on opposite sides of the center line, each pair of said inner track grooves being spaced apart from each other in the first direction and open towards each other, each of said inner track grooves extending along an imaginary plane normal to the first direction and being curved, and
two pairs of outer track grooves disposed below said top surface, and respectively and symmetrically disposed on said opposite sides of the center line, each pair of said outer track grooves being spaced apart from each other in the first direction and open away from each other, each of said outer track grooves extending along an imaginary plane normal to the first direction and being curved;
two support mechanisms that are respectively disposed on said opposite sides of the center line, that are symmetric with respect to the center line, that are movably connected to said track seat, and that are convertible between a folded state and an unfolded state, each of said support mechanisms including
a sliding frame having
a bearing plate portion that has a supporting surface, and a back surface being opposite to said supporting surface,
a sliding shaft that extends in the first direction, and that has opposite end segments respectively and movably engaging two corresponding ones of said inner track grooves of said track seat that are disposed on the same side of the center line, and
a support body that is connected to said back surface of said bearing plate portion, and that has a connecting end portion connected to said sliding shaft, and
two linking frames being spaced apart from each other in the first direction, respectively and slidably connected to opposite ends of said support body of said sliding frame, and respectively and movably engaging two corresponding ones of said outer track grooves of said track seat that are disposed on the same side of the center line; and
two synchronization mechanisms that are spaced apart from each other in the first direction, and that are respectively connected to opposite sides of said track seat, each of said synchronization mechanisms including
two pivot shafts extending in the first direction, respectively disposed on said opposite sides of the center line, and being rotatable relative to said track seat, and
two pivot members, each of said pivot members being co-rotatably connected to a respective one of said pivot shafts, and being slidably connected to a respective one of said linking frames, said pivot members being configured to move in a synchronous manner such that during conversion of said support mechanisms between the folded and unfolded states, movements of said support mechanisms relative to said track seat are synchronized.

2. The dual axis hinge as claimed in claim 1, wherein:
each of said inner track grooves has non-uniform curvature;
when said support mechanisms are in the unfolded state, each of said end segments of said sliding shaft of each of said support mechanisms is disposed at one of opposite ends of a corresponding one of said inner track grooves of said track seat that is proximate to the center line, and said supporting surface of each of said support mechanisms is coplanar with said top surface of said track seat; and
when said support mechanisms are in the folded state, each of said end segments of said sliding shaft of each of said support mechanisms is disposed at the other one of said opposite ends of said corresponding one of said inner track grooves of said track seat that is distal from the center line, and a distance between ends of said supporting surfaces of said support mechanisms that are proximate to said top surface is greater than a distance between ends of said supporting surfaces of said support mechanisms that are distal from said top surface.

3. The dual axis hinge as claimed in claim 1, wherein:
said sliding frame of each of said support mechanisms further has two first sliding grooves that are spaced apart from each other in the first direction, that face away from each other, and that extend in a second direction transverse to the first direction; and
each of said linking frames of each of said support mechanisms has a curved sliding portion that movably engages a respective one of said outer track grooves, and a support portion that movably engages a corresponding one of said first sliding grooves of said sliding frame, and that abuts slidably against said bearing plate portion of said sliding frame.

4. The dual axis hinge as claimed in claim 3, wherein:

each of said linking frames of said support mechanisms further has a second sliding groove that extends in the second direction, each of said pivot members of said synchronization mechanisms having a linking portion that movably engages said second sliding groove of a respective one of said linking frames of said support mechanisms;

when said support mechanisms are in the unfolded state, said linking portion of each of said pivot members is disposed at one of opposite ends of said second sliding groove of the respective one of said linking frames that is distal from the center line; and when said support mechanisms are in the folded state, said linking portion of each of said pivot members is disposed at the other one of said opposite ends of said second sliding groove of the respective one of said linking frames that is proximate to the center line.

5. The dual axis hinge as claimed in claim 4, wherein:

each of said synchronization mechanisms further includes
a gear seat that is fixedly connected to said track seat, and
a synchronizing member that is rotatably mounted in said gear seat, and that has a shaft rod portion extending in the second direction, and two bevel gears respectively connected to opposite ends of said shaft rod portion; and each of said pivot members of each of said synchronization mechanisms further has
a pivot portion that is connected co-rotatably to a respective one of said pivot shafts of a corresponding one of said synchronization mechanisms,
a main body portion that is connected between said pivot portion and said linking portion, and
a bevel gear portion that is formed on said pivot portion, and that engages a respective one of said bevel gears of a corresponding one of said synchronization mechanisms such that rotation of said synchronizing member of each of said synchronization mechanisms drives said pivot members to rotate in said synchronous manner.

6. The dual axis hinge as claimed in claim 5, wherein each of said synchronization mechanisms further includes two torsion spring units that are respectively mounted to said pivot shafts, and that exert a biasing torque thereon to provide a positioning effect.

7. The dual axis hinge as claimed in claim 5, wherein said gear seat of each of said synchronization mechanisms has:
a main component that has two shaft holes provided for said pivot shafts to extend respectively therethrough, and a retaining space for receiving said synchronizing member; and
a retaining member that has a board body confining said synchronizing member within said retaining space, and a retaining block protruding from said board body toward said main component and positioning said synchronizing member in said retaining space.

8. The dual axis hinge as claimed in claim 1, wherein said track seat includes two seat bodies that are arranged along the center line and that are fixedly connected together, each of said seat bodies having:
an inner surface that is formed with two corresponding ones of said inner track grooves which are spaced apart from each other in a second direction transverse to the first direction, said inner surfaces of said seat bodies facing towards each other; and
an outer surface that is opposite to said inner surface along the center line, and that is formed with two corresponding ones of said outer track grooves which are spaced apart from each other in the second direction, said outer surfaces of said seat bodies facing away from each other.

9. The dual axis hinge as claimed in claim 1, wherein said support body of each of said support mechanisms extends from a middle portion of said back surface of said bearing plate portion such that said linking frames of each of said support mechanisms abut slidably against said back surface of said bearing plate portion and are respectively disposed on opposite sides of said support body in the first direction.

* * * * *